United States Patent

Levine

[15] 3,655,917

[45] Apr. 11, 1972

[54] FREQUENCY DIVISION MULTIPLEX SYSTEM USING THE SPECTRUM OF A PERIODIC SYNCHRONIZING PULSE FOR PHASE CORRECTION

[72] Inventor: Richard C. Levine, Plainfield, N.J.

[73] Assignee: Diecomp Inc., Washington, D.C.

[22] Filed: May 1, 1970

[21] Appl. No.: 33,655

[52] U.S. Cl. ..........179/15 BS

[51] Int. Cl. ..........H04j 1/20

[58] Field of Search ..........179/15 BP, 15 BY, 15 BS

[56] References Cited

UNITED STATES PATENTS 2,558,439 6/1951 Hurault ..........179/15 BP

*Primary Examiner*—Ralph D. Blakeslee
*Attorney*—Pennie, Edmonds, Morton, Taylor and Adams

[57] ABSTRACT

A transmission system for transmitting data at optimum speeds through non-optimum transmission media utilizes a plurality of subcarriers having different frequencies and a special time synchronizing pulse wave having the subcarrier frequencies as its principal frequency components. In addition to providing time synchronization, the pulse wave provides phase and frequency reference information for correcting the phase and frequency of locally generated reference signals used in the demodulation of the data-carrying signal. This demodulation can be any type of demodulation which is expeditiously carried out using a local signal of known phase such as, for example, phase-sensitive demodulation, product demodulation, square-law demodulation, or frequency demodulation. In a preferred embodiment, a transmitting apparatus is so arranged that its components subsystems can be conveniently modified to operate as a receiver.

16 Claims, 5 Drawing Figures

INVENTOR
Richard C. Levine
BY Pennie, Edmonds, Morton, Taylor & Adams
ATTORNEYS

INVENTOR
Richard C. Levine
BY Pennie, Edmonds, Morton, Taylor & Adams
ATTORNEYS

FREQUENCY DIVISION MULTIPLEX SYSTEM USING THE SPECTRUM OF A PERIODIC SYNCHRONIZING PULSE FOR PHASE CORRECTION

BACKGROUND OF THE INVENTION

The present invention relates to a system for transmitting data at optimum speeds through non-optimum transmission media such as standard telephone voice transmission networks or high frequency radio channels.

The increasing demand for data transmission, combined with the limitations of the present telephone communications network, has led to an accelerating need for better methods of transmitting data among machines and between machines and people. The demand for data transmission is growing apace with the rapidly increasing use of automatic data processing. Efficient use of data processing equipment very often requires the transmission of data from an input/output terminal to a remote central processor (as in time-sharing systems) or direct computer-to-computer transmission.

While the telephone network furnishes an attractive source of data channels, its limitations require that a data transmission system be carefully designed in order to use the network most effectively. The telephone network is attractive because of its many points of access and its extensive switching capabilities. However, it is primarily designed for voice transmission, not for the rapid transmission of nonvocal data. As a consequence, telephone channels have a number of properties which present difficulties in the transmission of such data. Among these properties are narrow channel bandwidth, transmission non-linearity, and dispersive phase characteristics. The narrow bandwidth limits the bit rate per channel; the non-linearity produces intermodulation distortion; and the dispersion distorts the waveform of wideband signals. Another difficulty arises from the fact that the local carriers used in demodulation are sometimes imperfectly synchronized, producing frequency offset in the demodulated signal. In addition, all of these unfavorable properties are subject to slow time variation due to various path reroutings and to the average-level-sensitive amplifiers used in the system.

As a consequence of these difficulties, prior art data transmission systems have either required highly complex circuitry or have not fully utilized the bandwidth potentially available. For example, prior art systems using voice telephone channels have required special "conditioned" phone lines including elaborate adjustable equalizers to approach optimal transmission speeds. In addition, modulation methods have generally been restricted to a small number of signal levels—typically two and in rare cases four—because of the amplitude and frequency variation. As is well known, such modulation methods restrict the rate at which information can be transmitted much more than do methods which employ higher level or even analogue signals.

SUMMARY OF THE INVENTION

A transmission system for transmitting data at optimum speeds through non-optimum transmission media utilizes a plurality of subcarriers having different frequencies and a special time synchronizing pulse wave having the subcarrier frequencies as its principal frequency components. In addition to providing time synchronization, the pulse wave provides phase and frequency reference information for correcting the phase and frequency of locally generated reference signals used in the demodulation of the data-carrying signal. This demodulation can be any type of demodulation which is expeditiously carried out using a local signal of known phase such as, for example, phase-sensitive demodulation, product demodulation, square-law demodulation, or frequency demodulation. In a preferred embodiment, a transmitting apparatus is so arranged that its component subsystems can be conveniently modified to operate as a receiver.

BRIEF DESCRIPTION OF THE DRAWINGS

The advantages, nature and various additional features of the invention will appear more fully upon consideration of the illustrative embodiment now to be described in detail in connection with the accompanying drawings.

In the drawings.

DETAILED DESCRIPTION

Figures 1, 2A:
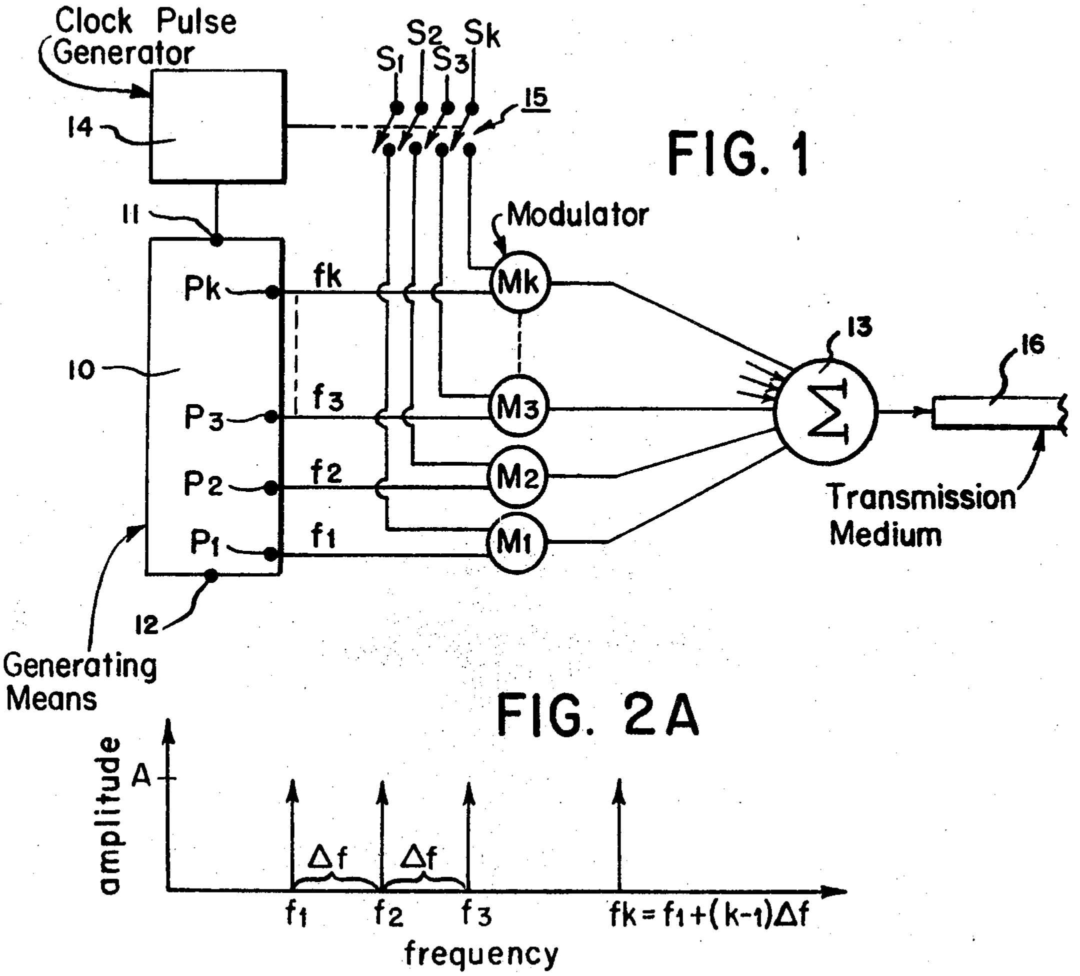
FIG. 1 is a schematic diagram of a transmitting apparatus for use in a data transmitting system in accordance with the invention.
FIG. 2A is a graphical representation, useful in understanding the invention, showing the spectrum of a synchronizing pulse wave used with the apparatus of FIG. 1.

In reference to the drawings, FIG. 1 shows a data transmitting apparatus comprising generating means 10 for generating a plurality of different frequencies $f_1, f_2, \ldots f_k$. The generating means can conveniently comprise a multifrequency generator, such as a comb frequency generator, for producing signals whose amplitude and base frequency can be adjusted by signals applied to an amplitude control terminal 11 and a frequency control terminal 12, respectively. The generator produces the subcarrier signals at output ports $P_1, P_2, \ldots P_k$. In a preferred embodiment of the invention, the subcarriers have equal amplitudes and equally spaced frequencies. Means for separately modulating each of the subcarriers are provided by a plurality of modulators $M_1, M_2, \ldots M_k$—preferably phase modulators—each of which is electrically coupled to a corresponding port and a corresponding signal source $S_1, S_2, \ldots S_k$.

Also provided is a pulse generating means for periodically generating special time synchronizing pulses between periods of data modulation. More specifically, each synchronizing pulse has an amplitude detectably different from that of the combined data-carrying signal; its principal frequency components are the frequencies of the subcarriers; and each of the subcarrier frequency components is at a predetermined reference phase. In the illustrative embodiment, this pulse generating means comprises a clock pulse generator 14 adapted to produce clock signals which simultaneously open a plurality of gates 15 between the signal sources and their respective modulators and increase the amplitudes of the generated carriers. In a facsimile transmission system, the clocking pulses can be conveniently synchronized with a plurality of scanners (one for each subcarrier) so that the amplitudes are increased at the end of a scanning cycle. If the scanners are all synchronized, they will typically all produce the same modulation signal at the end of the scanning cycle, and the gates 15 are not required.

The frequency adjusting terminal 12 is not generally used in transmission but, as will be shown below, is useful in altering the device to act as a receiver.

The outputs of the modulators are combined in combination means 13, such as an analog adding circuit, and the combined signal is coupled into a transmission medium 16, such as a standard telephone switched message network. The signal is then transmitted to a receiver (not shown) including pulse detection means responsive to the time synchronization pulses and phase correction means responsive to the phases of the frequency components of the pulses. (A specific example of such a receiver is described below.)

Figure 2B:
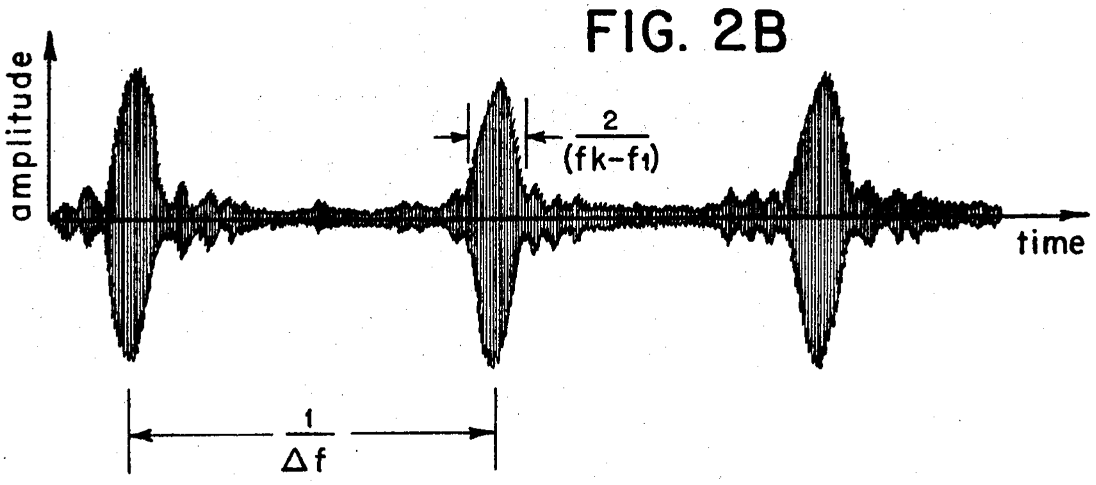
FIG. 2B is a graphical representation showing the amplitude of the synchronizing pulse wave as a function of time.

FIGS. 2A and 2B are graphical illustrations of the synchronizing pulse burst used in the preferred embodiment of the invention wherein the subcarriers are all of equal amplitude and equally spaced apart in frequency. FIG. 2A shows the spectral composition of the pulse comprising $k$ cosinusoidal components of equal amplitude and zero phase equally spaced between a lowest frequency $f_1$ and a highest frequency $f_k$. The interfrequency spacing is $\Delta f$. FIG. 2B shows the corresponding waveform as a function of time. This waveform comprises an envelope of large amplitude pulses occurring at a time spacing $\Delta T$, equal to the reciprocal of the interfrequency spacing, i.e., $\Delta T = 2/1/\Delta f$. The main lobe of each pulse has a width, $w$, equal to twice the reciprocal of the total bandwidth, i.e., $w = (2/f_k - f_1)$. This envelope encloses an apparent "carrier" frequency, $f_c$, equal to the median frequency of the spectrum utilized, i.e., $f_c = (f_1 + f_k/2)$.

Figure 2C:
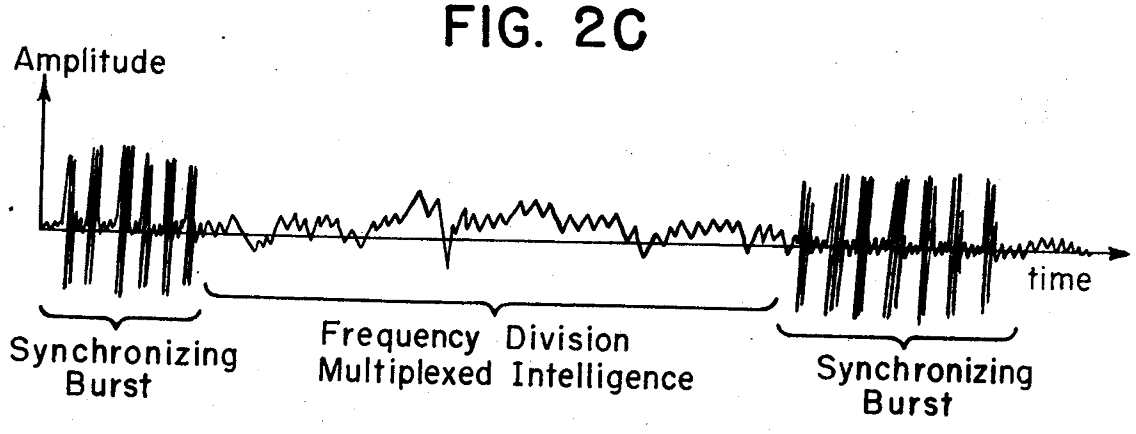
FIG. 2C is a graphical representation showing an example of the combination of the synchronizing pulse wave with a data signal.

FIG. 2C illustrates the effect of introducing the synchronizing pulse bursts into a frequency division multiplex signal. It is noteworthy that the amplitude of the synchronizing burst is made distinctly larger than that of the data carrying signal so that the burst may be separately detected. In addition, the energy in the burst is largely concentrated at the center frequency of the available channel bandwidth which is typically the frequency of minimum dispersion.

Figure 3:
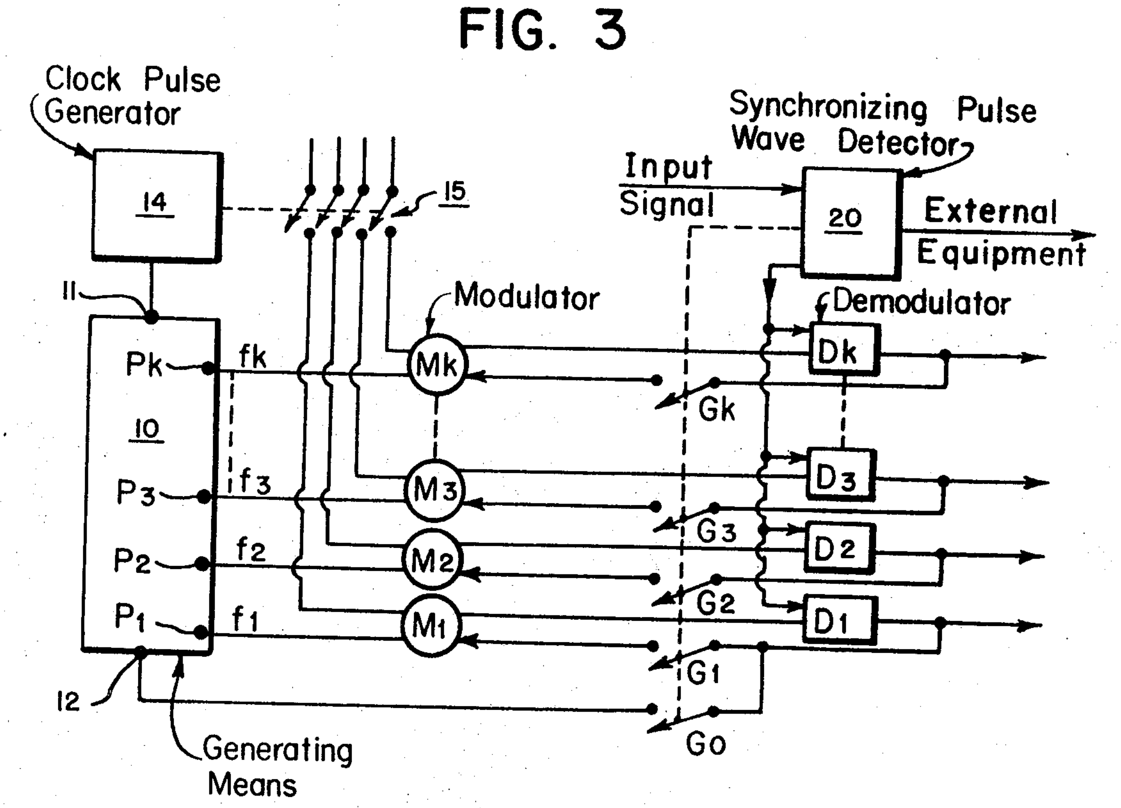
FIG. 3 is a schematic diagram of a receiving apparatus for use in a data transmitting system in accordance with the invention.

FIG. 3 shows a receiving apparatus useful in a data transmission system in accordance with invention. The receiver comprises a plurality of demodulators $D_1, D_2, \ldots D_k$, suitable for demodulating the corresponding subcarriers from the transmitting apparatus. They can, for example, comprise phase-sensitive demodulators, product demodulators or any other type of demodulators which expeditiously utilize local reference signals of known phase. The local reference signals are conveniently provided by connecting the demodulators with the corresponding subcarrier modulators of a generating means 10 similar to that used in the transmitting apparatus of FIG. 1. Time, phase and frequency correction information is conveniently obtained from the time synchronization pulses by providing a synchronizing pulse wave detector 20 for controlling a plurality of gated feedback loops $L_1, L_2, \ldots L_k$ between the outputs of the demodulators and the modulators of the corresponding reference subcarriers. Advantageously, the gates are sample-and-hold gates.

The synchronizing pulse wave detector 20 can be any one of many amplitude sensitive pulse-triggered circuits well known in the television or facsimile transmission art. In essence, it comprises means responsive to synchronizing pulses larger in amplitude than any anticipated signal level of the data to be transmitted. The detected synchronizing pulses are used to control the sample-and-hold gates and, in addition, any external equipment to be synchronized such as, for example, facsimile scanners.

In operation, the incoming signal is applied to the synchronizing pulse detector 20. During the synchronizing pulse burst portions of the signal, detector 20 detects the burst and switches on the gates in the feedback loops in order to feed back to controllable phase shifting networks in each of the modulators signals corresponding to the respective phase differences between the reference signals and the respective subcarrier frequency components of the synchronizing pulse burst. This feedback arrangement brings the phase of each of the locally generated reference signals emerging from the phase modulators into phase equality with each of the corresponding subcarrier frequency components of the synchronizing pulse burst.

An additional feedback loop $L_o$ including a gate $G_o$ is disposed between the output of demodulator $D_1$ (or any of the other demodulators alone or in combination) and the frequency control terminal 12 in order to adjust the frequency offset of all the locally generated reference signals so that their actual frequencies are equal to the spectral frequency components of the synchronizing pulse wave. This adjustment compensates for frequency offset introduced during transmission.

When the synchronizing burst has passed through detector 20, the gates are released but retain the same phase correcting signals while the subsequently arriving data signal is demodulated. The time between successive pulse bursts is chosen to be small compared to the rate at which significant phase and frequency variations are introduced by the transmission system.

This type of transmission system has a number of additional advantages. For example, the use of several narrow bandwidth signals rather than a smaller number of wideband signals eliminates the need for elaborate wideband phase equalizers to correct the overall group delay of the channel. This advantage accrues because the variation in group delay across the narrow bandwidth channels is relatively small. Another advantage over prior art techniques is the fact that multilevel and even amplitude modulation can be used with this system at near-optimum transmission speeds. In addition, the time synchronization pulses arrive at constant time spacing despite the frequency offset and the dispersive characteristics of the transmission channel.

It is understood that the above-described arrangements are merely illustrative of a small number of the many specific embodiments which can represent applications of the invention. FOr example, while the specific transmitting apparatus described used phase modulation, the system may equally well be adapted to use frequency modulation and amplitude modulation (carrier present or carrier absent, single or double sideband). Frequency modulation may be achieved, for example, by using quadrature phase modulators for $M_1, M_2, \ldots M_k$ and inserting integrating circuits between the signal sources and the modulators. The demodulators in such a system can conveniently comprise differentiators in series with phase demodulators. Amplitude modulation, on the other hand, can be obtained by simply replacing the integrating circuits with dc biasing means of one polarity and the differentiators with biasing means of the opposite polarity. These and other techniques for converting phase modulation systems into other types of modulation systems are described in detail by S. J. Mason and H. J. Zimmermann in *Electronic Circuits, Signals and Systems*, pp. 524–538 (1960). In addition, a wide variety of spectral compositions and corresponding time waveforms are useful as synchronizing signals, and the precise parameters of the signals can be especially selected to best utilize the characteristics of a particular transmission channel. Thus, it is clear that numerous and varied other arrangements can be readily devised by those skilled in the art without departing from the spirit and scope of the invention.

I claim:

1. A data transmission system comprising:
   a. means for generating a plurality of electrical subcarrier signals each having a different frequency;
   b. means for separately modulating data periodically onto said subcarrier signals;
   c. means for combining said subcarrier signals after they have passed through said modulators and for coupling the resulting signal into an electrical signal transmission medium;
   d. means for periodically generating time synchronization pulses for application to said transmission medium between periods of data modulation, said pulses being comprised of a plurality of simultaneously combined subcarrier signals formed by said generating means, each of said subcarrier signals so combined being at a predetermined reference phase and the combined amplitude of said subcarrier signals in the time synchronization pulses being detectably larger than the amplitude of the combined data-carrying subcarriers; and
   e. means for receiving the signal from said transmission medium including time synchronization pulse detection means responsive to said time synchronization pulses and phase correction means responsive to the phases of the subcarrier signals that comprise said synchronization pulses.

2. A system according to claim 1 wherein said means for receiving the signal from said transmission medium includes frequency adjustment means responsive to the phases of said subcarrier signals that comprise said synchronization pulses.

3. A system according to claim 1 wherein:

said means for generating a plurality of electrical subcarrier signals comprises a multifrequency generator including an amplitude control terminal responsive to a clocking signal; and said means for generating time synchronization pulses comprise, a clocking signal generator for generating clocking pulses to increase the amplitude of the subcarrier signals from said multifrequency generator.

4. A system according to claim 3 wherein:

said means for separately modulating data periodically onto said subcarrier signals comprise a plurality of phase modulators separately connected to a plurality of data sources through a plurality of gates responsive to said clocking signals; and including means for applying said clocking pulses to open said gates.

5. A system according to claim 4 wherein said multifrequency generator is adapted to generate a plurality of subcarrier signals which are equally spaced apart in frequency and which have substantially equal amplitudes and phases.

6. A system according to claim 5 wherein the receiver includes means responsive to the phases of the subcarrier signals that comprise the time synchronization pulses for adjusting the frequency of a local reference signal generating means.

7. A system according to claim 6 wherein the receiver comprises:

a plurality of demodulators for separately demodulating each of the modulated subcarriers;

a multifrequency generator, including a frequency adjusting terminal, for generating subcarrier reference signals for use in demodulating said modulated subcarriers;

a plurality of phase modulators separately coupled between the corresponding output ports of the generator and the corresponding demodulator;

a synchronizing pulse detector for receiving a transmitted signal;

a plurality of feedback loops connecting the outputs of said demodulators with their corresponding modulators, each of said feedback loops including a gate responsive to the output of said synchronizing pulse detector;

and a feedback loop from the output of at least one demodulator to the frequency adjusting terminal of said generator;

the receiver being arranged and adapted so that the gates in the feedback loops are closed upon the detection of synchronization pulses and opened at the end of said pulses.

8. A system according to claim 7 wherein the gates in said feedback loops are sample-and-hold gates.

9. A data transmitting apparatus comprising:

a. means for generating a plurality of electrical subcarrier signals each having a different frequency;

b. means for separately modulating data periodically onto said subcarrier signals;

c. means for combining said subcarrier signals after they have passed through said modulators and for coupling the resulting signal into an electrical signal transmission medium; and d. means for periodically generating time synchronization pulses for application to said transmission medium between periods of data modulation, said pulses being comprised of a plurality of simultaneously combined subcarrier signals formed by said generating means, each of said subcarrier signals so combined being at a predetermined reference phase and the combined amplitude of said subcarrier signals in the time synchronization pulses being detectably larger than the amplitude of the combined data-carrying subcarriers.

10. Apparatus according to claim 9 wherein:

said means for generating a plurality of electrical subcarrier signals comprises a multifrequency generator including an amplitude control terminal responsive to a clocking signal; and said means for generating time synchronization pulses comprises a clocking signal generator for generating clocking pulses to increase the amplitude of the subcarrier signals from said multifrequency generator.

11. Apparatus according to claim 10 wherein:

said means for separately modulating data periodically onto said subcarrier signals comprise a plurality of phase modulators separately connected to a plurality of data sources through a plurality of gates responsive to said clocking signal; and including means for applying said clocking pulses to open said gates.

12. A system according to claim 11 wherein said multifrequency generator is adapted to generate a plurality of subcarrier signals which are equally spaced apart in frequency and which have substantially equal amplitudes and phases.

13. A data receiving apparatus comprising:

a plurality of demodulators for separately demodulating each of a plurality of modulated subcarriers of different frequencies;

a multifrequency generator, including a frequency adjusting terminal, for generating subcarrier reference signals for use in demodulating said modulated subcarriers;

a plurality of phase modulators separately coupled between the corresponding output ports of the generator and the corresponding demodulator;

a synchronizing pulse detector for receiving a transmitted signal;

a plurality of feedback loops connecting the outputs of said demodulators with their corresponding modulators, each of said feedback loops including a gate responsive to the output of said synchronizing pulse detector;

and a feedback loop from the output of at least one demodulator to the frequency adjusting terminal of said generator;

the apparatus being arranged and adapted so that the gates in the feedback loops are closed upon the detection of synchronization pulses and opened at the end of said pulses.

14. The data transmission system of claim 1 wherein the time synchronization pulses are comprised of each of the subcarrier signals on which data may be modulated.

15. The data transmission system of claim 7 wherein the time synchronization pulses are comprised of each of the subcarrier signals on which data may be modulated.

16. The data transmission apparatus of claim 9 wherein the time synchronization pulses are comprised of each of the subcarrier signals on which data may be modulated.

* * * * *

PO-1050
(5/69)

UNITED STATES PATENT OFFICE
CERTIFICATE OF CORRECTION

Patent No. 3,655,917 Dated April 11, 1972

Inventor(s) Richard C. Levine

It is certified that error appears in the above-identified patent and that said Letters Patent are hereby corrected as shown below:

Column 3, line 9, "$\Delta T = 2/1/\Delta f$" should read -- $\Delta T = 1/\Delta f$ --;

Column 3, line 13, "$f_c = (f_1+f_k/2)$" should read -- $f_c = (f_1+f_k)/2$ --.

Column 5, line 7, "prise" should read -- prises --;

Column 5, line 15, "signals" should read -- signal --.

Signed and sealed this 5th day of September 1972.

(SEAL)
Attest:

EDWARD M.FLETCHER,JR.
Attesting Officer

ROBERT GOTTSCHALK
Commissioner of Patents